United States Patent
Khan et al.

(10) Patent No.: US 8,644,130 B2
(45) Date of Patent: Feb. 4, 2014

(54) SYSTEM AND METHOD FOR SUBCARRIER ALLOCATION IN A WIRELESS MULTIHOP RELAY NETWORK

(75) Inventors: Farooq Khan, Allen, TX (US); Joseph R. Cleveland, Murphy, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 2588 days.

(21) Appl. No.: 11/344,298

(22) Filed: Jan. 31, 2006

(65) Prior Publication Data

US 2006/0209671 A1    Sep. 21, 2006

Related U.S. Application Data

(60) Provisional application No. 60/663,075, filed on Mar. 18, 2005.

(51) Int. Cl.
*H04J 11/00* (2006.01)
(52) U.S. Cl.
USPC ............. 370/208; 370/343; 370/527; 455/60; 455/69; 455/62
(58) Field of Classification Search
USPC ........ 370/208, 319, 203, 516; 455/60, 69, 62, 455/13.1
See application file for complete search history.

(56) References Cited

U.S. PATENT DOCUMENTS

| | | | |
|---|---|---|---|
| 6,172,993 B1 * | 1/2001 | Kim et al. | 370/516 |
| 2002/0039383 A1 | 4/2002 | Zhu et al. | |
| 2005/0094550 A1 * | 5/2005 | Huh et al. | 370/203 |
| 2005/0195910 A1 | 9/2005 | Kim et al. | |
| 2005/0232183 A1 * | 10/2005 | Sartori et al. | 370/319 |
| 2005/0286409 A1 | 12/2005 | Yoon et al. | |

FOREIGN PATENT DOCUMENTS

| | | |
|---|---|---|
| KR | 10-2006-0038131 A | 5/2006 |
| WO | WO 2005/022810 A2 | 3/2005 |

OTHER PUBLICATIONS

Supplementary European Search Report dated Nov. 25, 2010 in connection with European Patent Application No. EP 06 71 6462.
Wolfgang Zirwas, et al., "Radio resource management in cellular multihop networks", European Transactions on Telecommunications, vol. 15, Jul. 1, 2004, p. 375-389.
Gerhard Munz, et al., "An Efficient Waterfilling Algorithm for Multiple Access OFDM", 2002 IEEE, p. 681-685.
Ralf Pabst, et al., "Relay-Based Deployment Concepts for Wireless and Mobile Broadband Radio", IEEE Communications Magazine, Sep. 2004, p. 80-89.

* cited by examiner

*Primary Examiner* — David Q Nguyen

(57) ABSTRACT

The present disclosure relates generally to a system and method for use in a communications network. In one example, the method includes dividing a total available frequency band of a first node into a multiple subcarriers using orthogonal frequency division multiplexing (OFDM). A first portion of subcarriers is allocated to a first link coupling the first node with a second node and a second portion of the subcarriers is allocated to a second link coupling the first node to a third node.

20 Claims, 5 Drawing Sheets

SYSTEM AND METHOD FOR SUBCARRIER ALLOCATION IN A WIRELESS MULTIHOP RELAY NETWORK

CROSS-REFERENCE

This application is related to U.S. Provisional Patent Ser. No. 60/663,075, filed on Mar. 18, 2005, and entitled "SUB-CARRIER ALLOCATION IN A WIRELESS MULTIHOP RELAY NETWORK, which is incorporated herein by reference.

BACKGROUND

Wireless multihop relay networks enable one node to communicate with another node via one or more intermediary nodes. The intermediary node, often called a relay, receives a signal from one node and sends it to the next node. The relay may perform processing on the signal, although such processing may not be performed by some relays. An example of such a network is a cellular wireless multihop relay network, where communication between a base station and a mobile station is assisted by one or more relays. Generally, the relay receives the signal from the base station and transmits it to the mobile station or another relay. Similarly, in the reverse direction, the relay receives the signal from the mobile station and transmits it to the base station or another relay. However, limitations exist with current multihop implementations and the provision of multihop services is challenging.

SUMMARY

In one embodiment, a method for use by a first node in a communications system is provided. The method comprises dividing a total available frequency band of the first node into a plurality of subcarriers using orthogonal frequency division multiplexing (OFDM). A first portion of the plurality of subcarriers is allocated to a first link coupling the first node with a second node and a second portion of the plurality of subcarriers is allocated to a second link coupling the first node to a third node. The first node can communicate simultaneously with the second and third nodes using the first and second portions of the plurality of subcarriers, respectively.

In another embodiment, a system is provided. The system comprises a first node positioned between second and third nodes and configured to relay communications between the second and third nodes. The first node is associated with a total available frequency band that is divided into at least a first subcarrier for communicating with the second node via a first link and a second subcarrier for communicating with the third node via a second link. The first and second subcarriers can be used simultaneously.

In still another embodiment, a method for use in a network is provided. The method comprises allocating, by a first node, at least a first subcarrier to a first link coupling the first node with a second node, where the first subcarrier is a portion of a total frequency band available to the first node. The first node also allocates at least a second subcarrier to a second link coupling the first node with a third node, where the second subcarrier is a portion of the total frequency band. The first node communicates with the second and third nodes using the allocated first and second subcarriers, respectively, where the communications with the second and third nodes can occur simultaneously.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
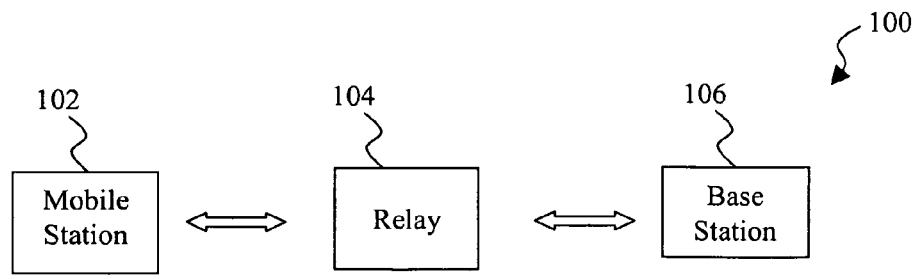
FIG. 1 is a diagram of one embodiment of a system within which the present invention may be practiced.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a communications system 100 illustrates a system in which various embodiments of the present disclosure may be practiced. In the present example, the system 100 represents a portion of a cellular wireless multihop relay network that enables a mobile station (MS) 102 to communicate wirelessly with other mobile stations and landline devices. The mobile station 102 may be a cellular telephone, a personal digital assistant (PDA), a portable computer, or any other type of mobile device capable of communicating wirelessly with the system 100. In the present example, a relay 104 is positioned between the mobile station 102 and a base station 106. It is understood that the base station (BS) 106 may represent multiple components of the system 100 (e.g., a base transceiver station (BTS) and a base station controller (BSC)) or may represent only the component communicating directly with the mobile station 102. Accordingly, the term "base station" should be interpreted broadly as representing hardware and software that enables communication with the mobile station 102. In addition, the configuration of the base station may vary depending on the particular technology used to implement the system 100 (e.g., Code Division Multiple Access (CDMA), Global System for Mobile communication (GSM), or Orthogonal Frequency Division Multiplexing (OFDM)).

The relay 104 assists the communications between the base station 106 and the mobile station 102. The relay 104 receives the signal from the base station and, after any processing and amplification is performed, sends the signal to the mobile station 102. Similarly, in the reverse direction, the relay 104 receives the signal from the mobile station 102 and transmits it to the base station 106 (again after any desired processing and/or amplification occurs). Additional relays (not shown) may be positioned between the relay 104 and the mobile station 102/base station 106. Accordingly, while the following disclosure uses a two hop linear relay system as an example, it is understood that the various embodiments may be applied to a multihop system.

The relay 104 is generally characterized as an analog relay or a digital relay. With an analog relay, also referred to as a non-regenerative relay, the received signal is simply amplified and forwarded to the destination node. With a digital relay, also referred to as a regenerative relay, the information is demodulated/decoded and then encoded/modulated before being amplified and forwarded to the destination node. Relay-based networks may be characterized as having either a homogeneous relay architecture or a heterogeneous relay architecture. In a homogeneous relay architecture, a single common air-interface is used for both the user and backhaul traffic, while separate air-interfaces are used for the user and backhaul traffic in a heterogeneous relay architecture.

Figure 2:
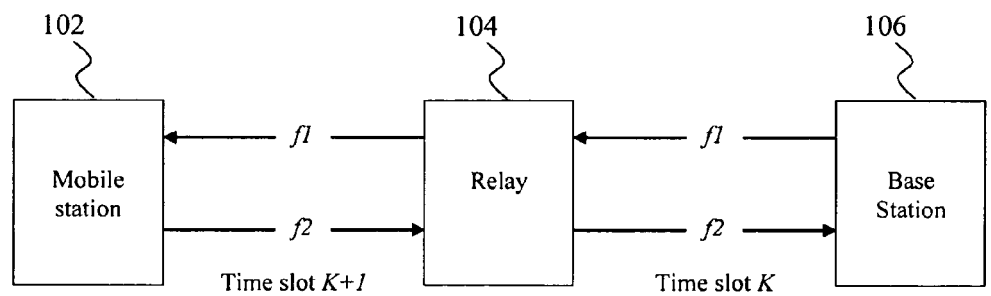
FIG. 2 is a block diagram of a relay system using frequency division duplexing.
Figure 3:
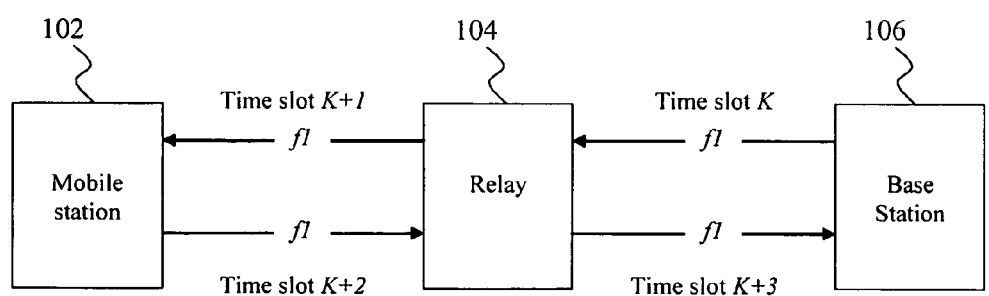
FIG. 3 is a block diagram of a relay system using time division duplexing.

Referring to FIGS. 2 and 3, current relay-based wireless systems are generally based on either a Frequency Division Duplexing (FDD) scheme (FIG. 2) or a Time Division Duplexing (TDD) scheme (FIG. 3). In an FDD approach, incoming and outgoing traffic transmissions take place on separate frequency bands. In the example of FIG. 2, the relay 104 receives a transmission from the base station 106 on frequency band f1 and performs a transmission to the base station on frequency band f2. Similarly, in the next time slot, the relay 104 can send and receive data from the mobile station 102 on frequency band f1 and frequency band f2, respectively.

Figure 5:
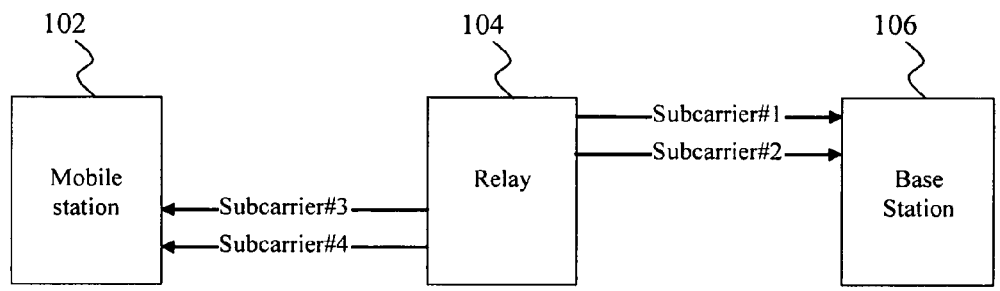
FIG. 5 is a block diagram of one embodiment of a system where a relay is sending transmissions using an available frequency band that has been divided into subcarriers.

In a TDD scheme, the same frequency carrier is used for all transmissions between the base station 106, relay 104, and mobile station 102, as illustrated in FIG. 5. In order to avoid interference between the transmissions, the transmissions need to be orthogonal in time (i.e., the transmissions on various links happen in separate time slots). In the present example, the transmissions on the BS-Relay link, Relay-MS link, MS-Relay link, and Relay-BS link occur in time slots K, (K+1) (K+2), and (K+3), respectively. It is noted that the relay 104 cannot transmit and receive data on the same frequency carrier at the same time in either the FDD scheme or the TDD scheme. Moreover, neither scheme enables a tradeoff between bandwidth and power on the various links for flexible and efficient use of radio resources.

If the relay 104 is not at the propagation midpoint between the base station 106 and the mobile station 102, there is a time delay between the two arriving signals. This can lead to misalignment between the sinusoids of the two sets of signals, which need to be aligned in order to be orthogonal. Accordingly, a cyclic prefix can be added that allows the tones to be realigned at the receiver, thus regaining orthogonality. In absolute terms, to generate a pure sinusoidal tone requires that the signal start at time minus infinity. This is important because tones are the only waveform that can ensure orthogonality. Fortunately, the channel response can be treated as finite, because multipath components decay over time and the channel is effectively band-limited. By adding a guard time, called a cyclic prefix, the channel can be made to behave as if the transmitted waveforms were from time minus infinity, and thus ensure orthogonality, which essentially prevents one subcarrier from interfering with another (i.e., inter-symbol interference (ISI)).

The cyclic prefix is actually a copy of the last portion of the data symbol appended to the front of the symbol during the guard interval. The cyclic prefix is sized appropriately to serve as a guard time to eliminate ISI. This is accomplished because the amount of time dispersion from the channel is smaller than the duration of the cyclic prefix. A fundamental trade-off is that the cyclic prefix must be long enough to account for the anticipated time delay spread experienced by the relay. Accordingly, the amount of overhead increases as the cyclic prefix gets longer. The sizing of the cyclic prefix forces a tradeoff between the amount of delay spread that is acceptable and the amount of Doppler shift that is acceptable.

Figure 4:
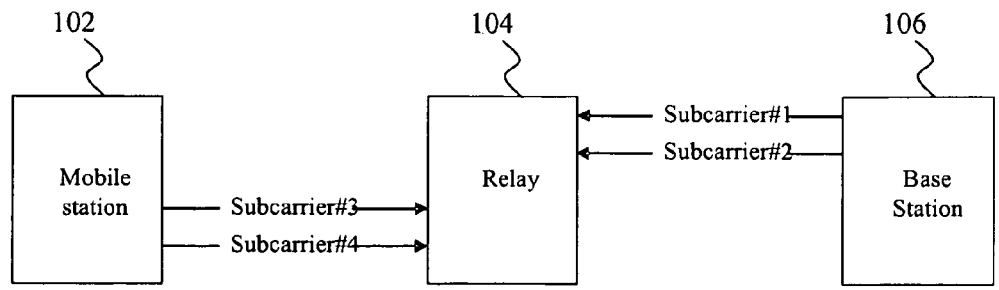
FIG. 4 is a block diagram of one embodiment of a system where a relay is receiving transmissions using an available frequency band that has been divided into subcarriers.

Referring to FIGS. 4 and 5, in one embodiment, the system 100 is configured to enable the simultaneous reception of data from two adjacent nodes using orthogonal OFDM subcarriers in each of the two links (e.g., BS-Relay link and MS-Relay link). In an OFDM system, a high data rate stream is parallel to serial converted, which results in a lower rate on each of the parallel streams. The multiple parallel data streams are then mapped to orthogonal subcarriers. In the present example, using OFDM, the total available frequency band is divided into N subcarriers, where N is the fast Fourier transform (FFT)/inverse FFT (IFFT) size used. For purposes of illustration, a total of four OFDM subcarriers (FFT/IFFT size of four) are used for communication on the base station to relay link and mobile station to relay link. More specifically, subcarriers 1 and 2 are used on the BS-Relay link and subcarriers 3 and 4 on the MS-Relay link. Using this configuration, data can be received by the relay 104 simultaneously from the base station 106 and the mobile station 102 (FIG. 4). Similarly, the relay 104 can forward data to the base station 106 and the mobile station 102 on subcarriers 1 and 2, and subcarriers 3 and 4 (FIG. 5). Accordingly, the relay 104 can transmit data simultaneously to the base station 106 and the mobile station 104 because the transmissions on the Relay-BS link and Relay-MS link occur on orthogonal subcarriers.

Figure 6:
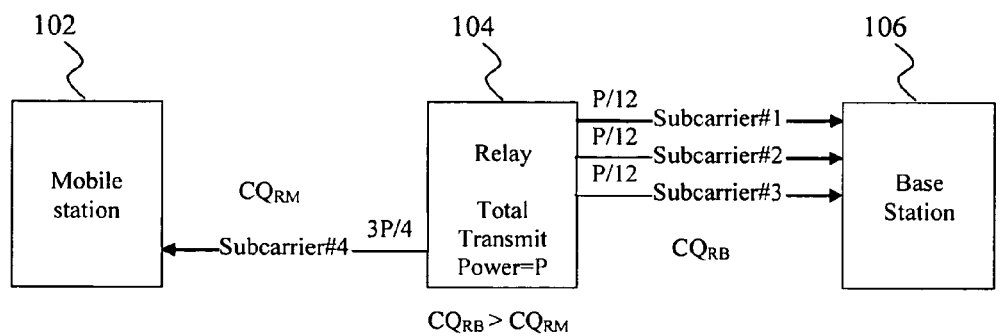
FIG. 6 is a block diagram of one embodiment of a system where the subcarriers are allocated based on channel quality for sending purposes.

Referring to FIG. 6, in another embodiment, the power and number of subcarriers on the links may be allocated based on the links' channel quality (CQ). In the present example, the channel quality on the Relay-BS link ($CQ_{RB}$) is better than the channel quality on the Relay-MS link ($CQ_{RM}$) (i.e., $CQ_{RB} > CQ_{RM}$). In general, links with higher channel quality are bandwidth limited and links with lower channel quality are power limited. Therefore, the system's performance can be improved by allocating more bandwidth to the link with good channel quality and more power to the link with lower channel quality. Accordingly, ¾ of the relay's power and ¼ of the relay's bandwidth (i.e., one subcarrier out of the four total subcarriers) are allocated to the Relay-MS link, while ¼ of the power and ¾ of the bandwidth are allocated to the Relay-BS link that has better channel quality. In the present example, the power per subcarrier on the Relay-BS link is P/12. It is understood that the channel quality may be reassessed, and that the subcarriers may be reallocated based on the results of the reassessment. In addition, in some embodiments, allocating more subcarriers to a specific link may not occur until a threshold (e.g., a $CQ_{RB}:CQ_{RM}$ ratio) has been met in order to prevent the allocation of additional subcarriers to a link that displays only a minor variation in channel quality.

Figure 7:
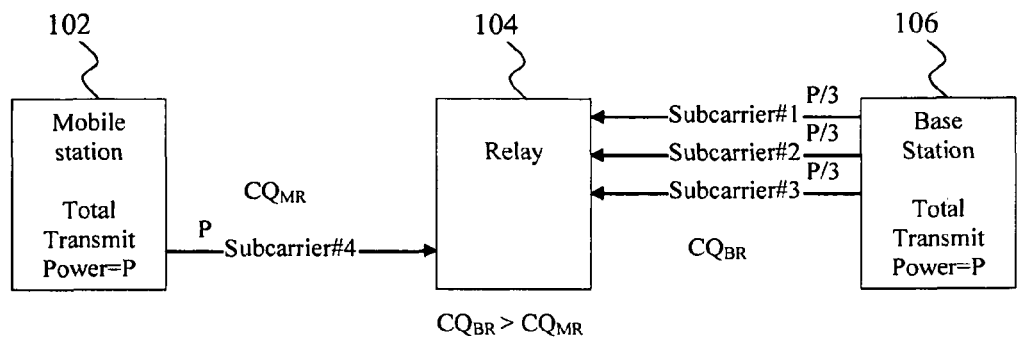
FIG. 7 is a block diagram of one embodiment of a system where the subcarriers are allocated based on channel quality for receiving purposes.

Referring to FIG. 7, in still another embodiment, a tradeoff between power and bandwidth can be performed when the relay 104 receives transmissions from the BS 106 and MS 102. As illustrated, the channel quality on the Relay-Base Station link ($CQ_{RB}$) is better than the channel quality on the Relay-Mobile station link ($CQ_{RM}$). Accordingly, more bandwidth (three out of the four subcarriers) is allocated to the BS-Relay link with better channel quality. Accordingly, bandwidth and power may be allocated by assigning a different number of subcarriers and a different amount of power to incoming and outgoing relay links.

Figure 8:
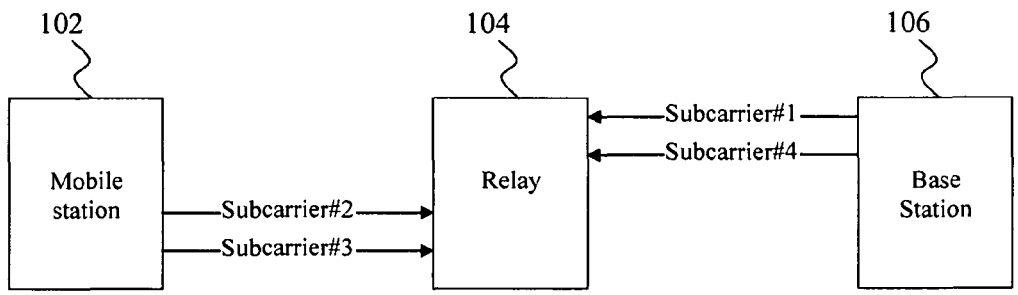
FIG. 8 is a block diagram of one embodiment of a system where the subcarriers are allocated based on the subcarriers' channel quality.

Referring to FIG. 8, in still another embodiment, the subcarriers may be allocated to the various links based on the individual channel quality of the subcarriers. In the present example, subcarriers 1 and 4 are allocated to the BS-Relay link because the channel quality on these subcarriers is better than the channel quality of subcarriers 2 and 3. However, the channel quality of subcarriers 2 and 3 is better on the MS-Relay link (e.g., due to independent fading on the BS-Relay and MS-Relay links). Accordingly, the transmission on the MS-Relay link takes place on subcarriers 2 and 3.

Figure 9:
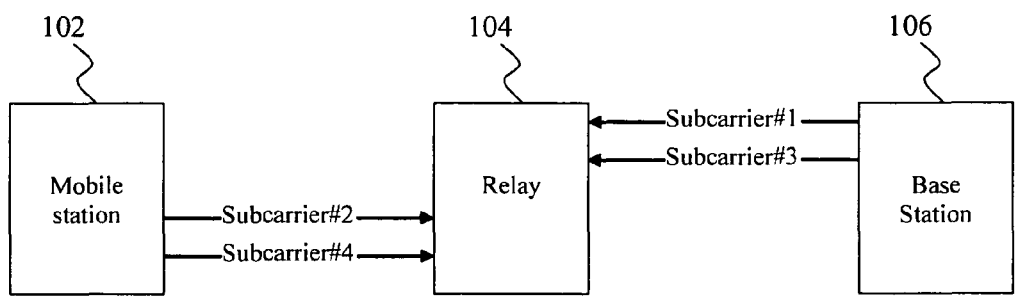
FIG. 9 is a block diagram of one embodiment of a system where the subcarriers of a link are distributed throughout the available frequency band.

Referring to FIG. 9, in yet another embodiment, the subcarriers may be allocated to the various links in such a way that the subcarriers are spread out over the whole bandwidth in order to provide frequency diversity. For example, subcarriers 1 and 3 may be allocated to the BS-Relay link and subcarriers 2 and 4 may be allocated to the MS-Relay link. It is understood that all subcarriers of a link may be non-contiguous (within the total available frequency band) or that some subcarriers of a link may be contiguous while others are non-contiguous.

Figure 10:
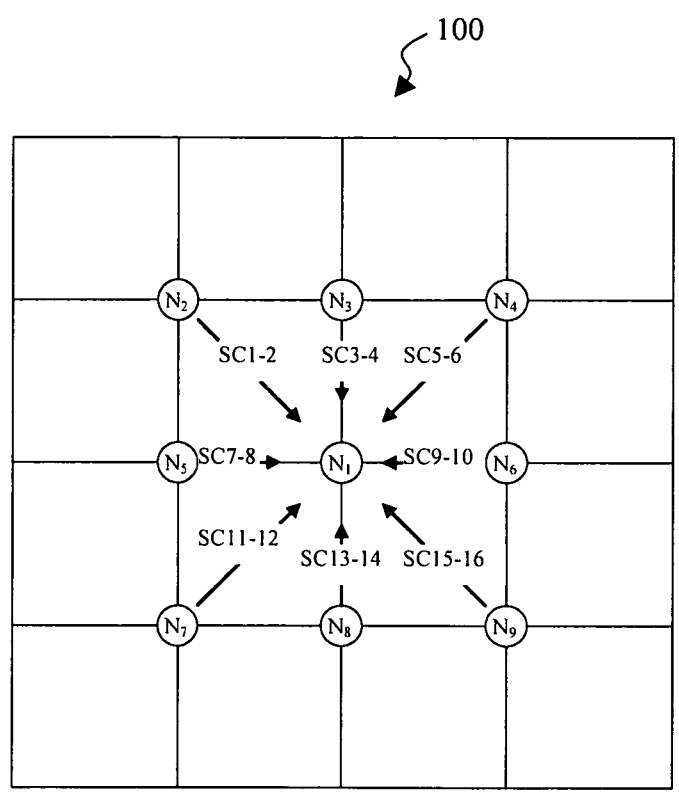
FIG. 10 is a block diagram of one embodiment of a mesh network architecture having a receiving node that uses allocated subcarriers to communicate with neighboring nodes.

Referring to FIG. 10, in another embodiment, a mesh architecture is illustrated. In the present example, a node in the multihop mesh network can communicate with potentially all its neighboring nodes. Accordingly, a technique that enables a receiving node ($N_1$) to coordinate transmissions can allow simultaneous communication with multiple neighboring nodes ($N_2$-$N_9$) using orthogonal subcarriers while avoiding interference. In the example shown, a total of sixteen subcarriers (SC1-SC16) are shared equally among eight nodes. The node $N_1$ is the receiving node and nodes $N_2$-$N_9$ are transmitting nodes. The transmissions are scheduled by the receiving node $N_1$. The scheduling information can be sent by the receiving node $N_1$ in a broadcast message received by all the neighboring nodes. If the receiving node $N_1$ is expecting no information from a subset of the neighboring nodes, none of the subcarriers may be allocated to those nodes. The receiving node $N_1$ may also require that the neighboring nodes do not transmit any information to nodes other than $N_1$ during a time slot when $N_1$ schedules transmissions for reception.

In still another embodiment, the relay 104 may transmit pilot subcarriers in addition to data subcarriers for use by the mobile station 102 for purposes such as synchronization, carrier recovery, and channel estimation. Pilot subcarriers provide stable signals that stabilize carrier and clock frequency control in the mobile station 102.

Figure 11:
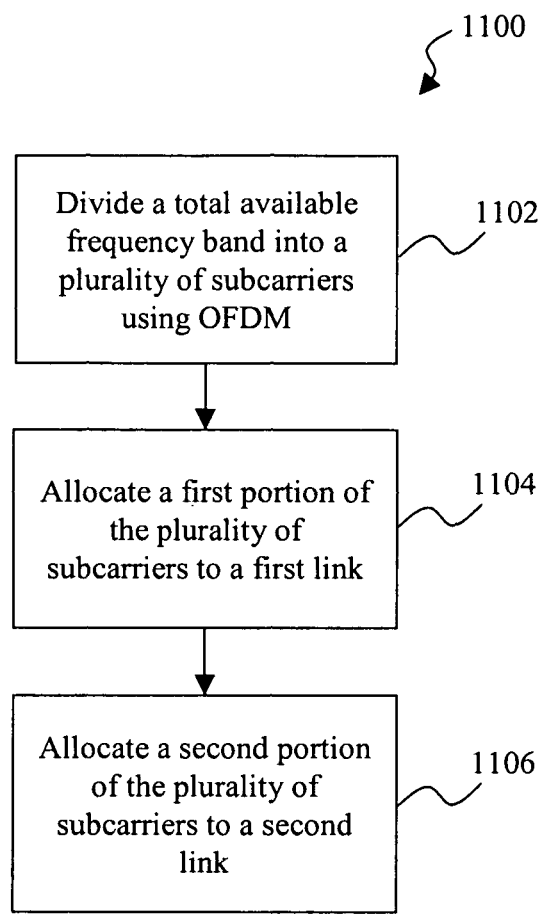
FIG. 11 is a flowchart of one embodiment of a method for allocating subcarriers of a total available frequency band.

Referring to FIG. 11, a method 1100 illustrates one embodiment of a process that may be used within the system 100 of FIG. 1. In step 1102, the total available frequency band of a node (e.g., the relay 104 of FIG. 1) is divided into a plurality of subcarriers using OFDM. A first portion of the plurality of subcarriers is then allocated to a first link in step 1104 and a second portion of the plurality of subcarriers is allocated to a second link in step 1106.

Although only a few exemplary embodiments of this disclosure have been described in details above, those skilled in the art will readily appreciate that many modifications are possible in the exemplary embodiments without materially departing from the novel teachings and advantages of this disclosure. For example, the allocation of subcarriers may be reassessed periodically or continually to provide for optimal use of the total available frequency band. Also, features illustrated and discussed above with respect to some embodiments can be combined with features illustrated and discussed above with respect to other embodiments. Accordingly, all such modifications are intended to be included within the scope of this disclosure.

What is claimed is:

1. A method for use by a first node in a communications system, the method comprising:
   dividing a total available frequency band of the first node into a plurality of subcarriers using orthogonal frequency division multiplexing (OFDM);
   allocating a first portion of the plurality of subcarriers to a first link coupling the first node with a second node; and
   allocating a second portion of the plurality of subcarriers to a second link coupling the first node to a third node, wherein the first node can simultaneously receive communications from the second and third nodes using the first and second portions of the plurality of subcarriers, respectively.

2. The method of claim 1 further comprising:
   identifying a channel quality of the first and second links; and
   allocating a larger portion of the subcarriers to the first or second link that has the higher channel quality than are allocated to the link having the lower channel quality.

3. The method of claim 2 further comprising allocating a greater portion of the relay's power to the first or second link having the lower channel quality than to the link having the higher channel quality.

4. The method of claim 1, wherein the total available frequency band is divided into N subcarriers, wherein N is the fast Fourier transform (FFT)/inverse FFT size used for the OFDM.

5. The method of claim 1 wherein the subcarriers in the first portion are not contiguous in frequency.

6. The method of claim 5 wherein at least two of the subcarriers of the first portion have frequencies that are separated by a frequency of a subcarrier of the second portion.

7. The method of claim 5 wherein the frequencies of the subcarriers of the first portion are distributed throughout the total available frequency band.

8. The method of claim 1 further comprising broadcasting scheduling information, by the first node, to the second and third nodes, wherein the scheduling information provides transmission information to the second and third nodes.

9. The method of claim 1 further comprising not allocating a portion of the total available frequency band to a fourth node if the first node is not expecting a transmission from the fourth node.

10. A system comprising:
    a first node positioned between second and third nodes and configured to relay communications between the second and third nodes, wherein the first node is associated with a total available frequency band that is divided into at least a first subcarrier for communicating with the second node via a first link and a second subcarrier for communicating with the third node via a second link, and wherein the first and second subcarriers can be used to receive communications simultaneously.

11. The system of claim 10 wherein the first node is configured to allocate a larger portion of the total available frequency band to whichever of the first or second links has a higher channel quality than the other link.

12. The system of claim 10 wherein the first node is configured to allocate a larger portion of the first node's available power to whichever of the first or second links has a lower channel quality than the other link.

13. The system of claim 10 wherein the total available frequency band is divided into N subcarriers using orthogonal frequency division multiplexing (OFDM), and wherein N is the fast Fourier transform (FFT)/inverse FFT size used for the OFDM.

14. A method for use in a network comprising:
    allocating, by a first node, at least a first subcarrier to a first link coupling the first node with a second node, wherein the first subcarrier is a portion of a total frequency band available to the first node;
    allocating, by the first node, at least a second subcarrier to a second link coupling the first node with a third node, wherein the second subcarrier is a portion of the total frequency band; and
    receiving, by the first node, from the second and third nodes using the allocated first and second subcarriers, respectively, wherein the receiving from the second and third nodes can occur simultaneously.

15. The method of claim 14 further comprising dividing the total frequency band into at least the first and second subcarriers using orthogonal frequency division multiplexing (OFDM).

16. The method of claim 14 further comprising allocating at least a third subcarrier to the first or second link that has a higher channel quality than the other link, wherein the link having the higher channel quality is allocated a larger portion of the total frequency band.

17. The method of claim 14 further comprising allocating a larger portion of the first node's available power to the first or second link that has a lower channel quality than the other link.

18. The method of claim 14 further comprising allocating a pilot subcarrier to the first link.

19. The method of claim 14 further comprising:
    identifying a channel quality of a third subcarrier relative to each of the first and second links; and
    allocating the third subcarrier to the first or second link where the third subcarrier has the higher channel quality.

20. The method of claim 15, wherein the total available frequency band is divided into N subcarriers, wherein N is the fast Fourier transform (FFT)/inverse FFT size used for the OFDM.

* * * * *